(12) United States Patent
Paul et al.

(10) Patent No.: US 11,095,670 B2
(45) Date of Patent: Aug. 17, 2021

(54) HIERARCHICAL ACTIVATION OF SCRIPTS FOR DETECTING A SECURITY THREAT TO A NETWORK USING A PROGRAMMABLE DATA PLANE

(71) Applicant: Cisco Technology, Inc., San Jose, CA (US)

(72) Inventors: Subharthi Paul, San Jose, CA (US); Saman Taghavi Zargar, Milpitas, CA (US); Jayaraman Iyer, Sunnyvale, CA (US); Hari Shankar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 234 days.

(21) Appl. No.: 16/030,116

(22) Filed: Jul. 9, 2018

(65) Prior Publication Data
US 2020/0014713 A1    Jan. 9, 2020

(51) Int. Cl.
*H04L 29/06* (2006.01)
*H04L 12/24* (2006.01)
*H04L 29/08* (2006.01)

(52) U.S. Cl.
CPC .......... *H04L 63/1425* (2013.01); *H04L 41/20* (2013.01); *H04L 63/1416* (2013.01); *H04L 63/20* (2013.01); *H04L 67/10* (2013.01)

(58) Field of Classification Search
CPC . H04L 63/1425; H04L 63/1416; H04L 63/63; H04L 67/10
USPC .......................................................... 726/23
See application file for complete search history.

(56) References Cited

U.S. PATENT DOCUMENTS

| 8,407,592 | B2 * | 3/2013 | Leahy | H04L 67/16 715/704 |
| 8,528,075 | B2 * | 9/2013 | Heim | G06F 21/566 726/21 |
| 8,892,903 | B1 * | 11/2014 | Trimberger | G09C 1/00 713/189 |
| 9,160,760 | B2 | 10/2015 | Vasseur et al. | |

(Continued)

OTHER PUBLICATIONS

As-filed Specification and Drawings in U.S. Appl. No. 61/923,847, filed Jan. 6, 2014, 164 pages.

(Continued)

*Primary Examiner* — Dant B Shaifer Harriman
(74) *Attorney, Agent, or Firm* — Edell, Shapiro & Finnan, LLC

(57) ABSTRACT

In one example embodiment, a network management device generates a first script defining a first function for detecting a first customizable network event in a sequence of customizable network events indicative of a security threat to a network. The network management device activates the first script at a first network device in the network so as to cause the first network device to execute the first function for detecting the first customizable network event, and obtains, from the first network device, one or more indications that the first network device has detected the first customizable network event. Based on the one or more indications, the network management device determines whether to activate a second script defining a second function for detecting a second customizable network event in the sequence at a second network device in the network capable of detecting the second customizable network event.

20 Claims, 16 Drawing Sheets

(56) References Cited

U.S. PATENT DOCUMENTS

| | | | |
|---|---|---|---|
| 9,413,779 B2 | 8/2016 | Vasseur et al. | |
| 9,450,978 B2 | 9/2016 | Vasseur et al. | |
| 9,503,466 B2 | 11/2016 | Vasseur et al. | |
| 9,521,158 B2 | 12/2016 | Di Pietro et al. | |
| 9,563,854 B2 | 2/2017 | Cruz Mota et al. | |
| 9,660,870 B1 * | 5/2017 | Kuhr | H04L 63/1433 |
| 9,870,537 B2 | 1/2018 | Vasseur et al. | |
| 10,084,650 B2 * | 9/2018 | Kristjansson | H04L 41/22 |
| 2007/0011741 A1 * | 1/2007 | Robert | H04L 43/00 726/22 |
| 2011/0239297 A1 * | 9/2011 | Unagami | G06F 21/55 726/22 |
| 2015/0019991 A1 * | 1/2015 | Kristj Nsson | H04L 41/0853 715/747 |
| 2015/0074756 A1 * | 3/2015 | Deng | H04L 63/1441 726/1 |
| 2015/0195145 A1 | 7/2015 | Di Pietro et al. | |
| 2017/0140285 A1 * | 5/2017 | Dotan-Cohen | H04W 4/02 |
| 2019/0020544 A1 * | 1/2019 | Kristjansson | H04L 41/22 |

OTHER PUBLICATIONS

Github, "Snort3", https://github.com/snort3/snort3, downloaded from the internet on Jun. 12, 2018, 6 pages.

"Better network forensics, in a fraction of the time.", Corelight, Inc., https://www.corelight.com/?gclid=CN3MtPntotYCFQKQaQodVbIFgA, downloaded from the internet on Jun. 12, 2018, 7 pages.

Blog, WordPress.com, "Suricata—Open Source IDS/IPS/NSM engine", https://suricata-ids.org/features, downloaded from the internet on Jun. 12, 2018, 3 pages.

Data Sheet, Cisco, "Cisco Stealthwatch Learning Network License", C78-737494-02, Nov. 2016, 5 pages.

At-a-Glance, Cisco, "Secure your branch networks with Cisco Stealthwatch Learning Network License", Jan. 2015, (1110R) C45-123456-00, 2 pages.

"Cognito artificial intelligence from Vectra augments security operations", Cognito Platform, Vectra, https://vectra.ai/how-it-works, downloaded from the Internet on Jun. 12, 2018, 7 pages.

"Introduction—Bro 2.5.4 documentation", Bro Network Security Monitor, https://www.bro.org/sphinx/intro/index.html, downloaded from the internet on Jun. 12, 2018, 5 pages.

A. Sharma, et al., "Evolution and Detection of Polymorphic and Metamorphic Malwares: A Survey", arXiv preprint arXiv: 1406.7061, Jun. 27, 2014, 5 pages.

Demisto Enterprise, "Comprehensive Platform for Automated Incident Response", https://www.demisto.com/product-automated-incident-response, downloaded from the internet on Jun. 12, 2018, 9 pages.

Demisto Enterprise, "Under the Hood", https://www.demisto.com/demisto-enterprise-under-the-hood, downloaded from the internet on Jun. 12, 2018, 6 pages.

"Cisco Threat Intelligence Director (TID)", https://www.cisco.com/c/en/us/td/docs/security/firepower/622/configuration/guide/fpmc-config-guide-v622/threat_intelligence_director_tid.pdf, downloaded from the internet on Jun. 12, 2018, 42 pages.

"SNORT Users Manual—2.9.11", The Snort Project, Aug. 31, 2017, pp. 1-135.

"SNORT Users Manual—2.9.11", The Snort Project, Aug. 31, 2017, pp. 136-270.

"Snort—Network Intrusion Detection & Prevention System", https://web.archive.org/web/20180708134417/https://www.snort.org, snapshot taken Jul. 8, 2018 by the Internet Archive Wayback Machine, 9 pages.

* cited by examiner

```
# timed callback function list
timed_callback_function_list = { (name = 'threshold_function', duration = 30),
                                 (name = 'export_function', duration = 30)
                               }
```
— 510

```
# configuring the statistics that need to be collected
observation_list = (

{ name = "ssh-login-attempt",
      event = { rule = 'tcp $EXTERNAL_NET any -> $HOME_NET 22  (flow:to_server,established;
                        content:\"SSH\",nocase, offset 0, depth 4;)'} ,
                handlers = ({    name = 'total_ssh_login_attempts_per_client_server_clientport',
                                 keys { (ipv4.client_ip),
                                        (ipv4.server_ip),
                                        (tcp.client_port) },
                                 values = { },
                                 features = ((stat.count)),
                                 export_duration = 3,
                                 export_file_name = 'ssh_login_attempts_per_connection.json',
                                 export_path = ''})
    }, { name = "total-bytes-on-port-22",
      event = { rule = 'tcp $EXTERNAL_NET any <> $HOME_NET 22'} ,
                handlers = ({    name = 'total_bytes_on_port22_per_client_server_clientport',
                                 keys={ (ipv4.client_ip),
                                        (ipv4.server_ip),
                                        (tcp.client_port) },
                                 values ={ (ipv4.len)},
                                 features = ((stat.sum)),
                                 export_duration = 3,
                                 export_file_name ='bytes_on_port_22_per_connection.json',
                                 export_path = '' } )
    }
)
```
— 520

```
function threshold_function(detector_ref)
        # function where the heuristic to be evaluated on the collected
        # statistics can be evaluated. This function is called in a separate
        # timer thread every 30 seconds -- as configured in the top of the
        # script
```
— 530

```
function export_function(detector_ref)
        # export the collected statistics
```
— 540

FIG.5

HIERARCHICAL ACTIVATION OF SCRIPTS FOR DETECTING A SECURITY THREAT TO A NETWORK USING A PROGRAMMABLE DATA PLANE

TECHNICAL FIELD

The present disclosure relates to network threat detection.

BACKGROUND

The process of proactively identifying security threats in a network is called "threat hunting." Modern Security Operation Centers (SOCs) employ "playbooks" for threat hunting and to identify security threats/breaches. Playbooks include "plays," which are complex queries that run against data collected from the network. This data may include alerts from security products and activity/system logs from network devices and endpoint devices, network metadata, and full/partial packet captures. The data may be stored in a centralized data store or in security information and event management tools. Some SOC solutions try to automate playbooks in order to programmatically run common threat hunting processes to save user time and resources.

BRIEF DESCRIPTION OF THE DRAWINGS

FIG. 5 illustrates a script for detecting configurable network events, according to an example embodiment.

DESCRIPTION OF EXAMPLE EMBODIMENTS

Overview

In one example embodiment, a network management device generates a first script defining a first function for detecting a first customizable network event in a sequence of customizable network events indicative of a security threat to a network. The network management device activates the first script at a first network device in the network so as to cause the first network device to execute the first function for detecting the first customizable network event, and obtains, from the first network device, one or more indications that the first network device has detected the first customizable network event. Based on the one or more indications, the network management device determines whether to activate a second script defining a second function for detecting a second customizable network event in the sequence at a second network device in the network capable of detecting the second customizable network event.

Example Embodiments

Figure 1:
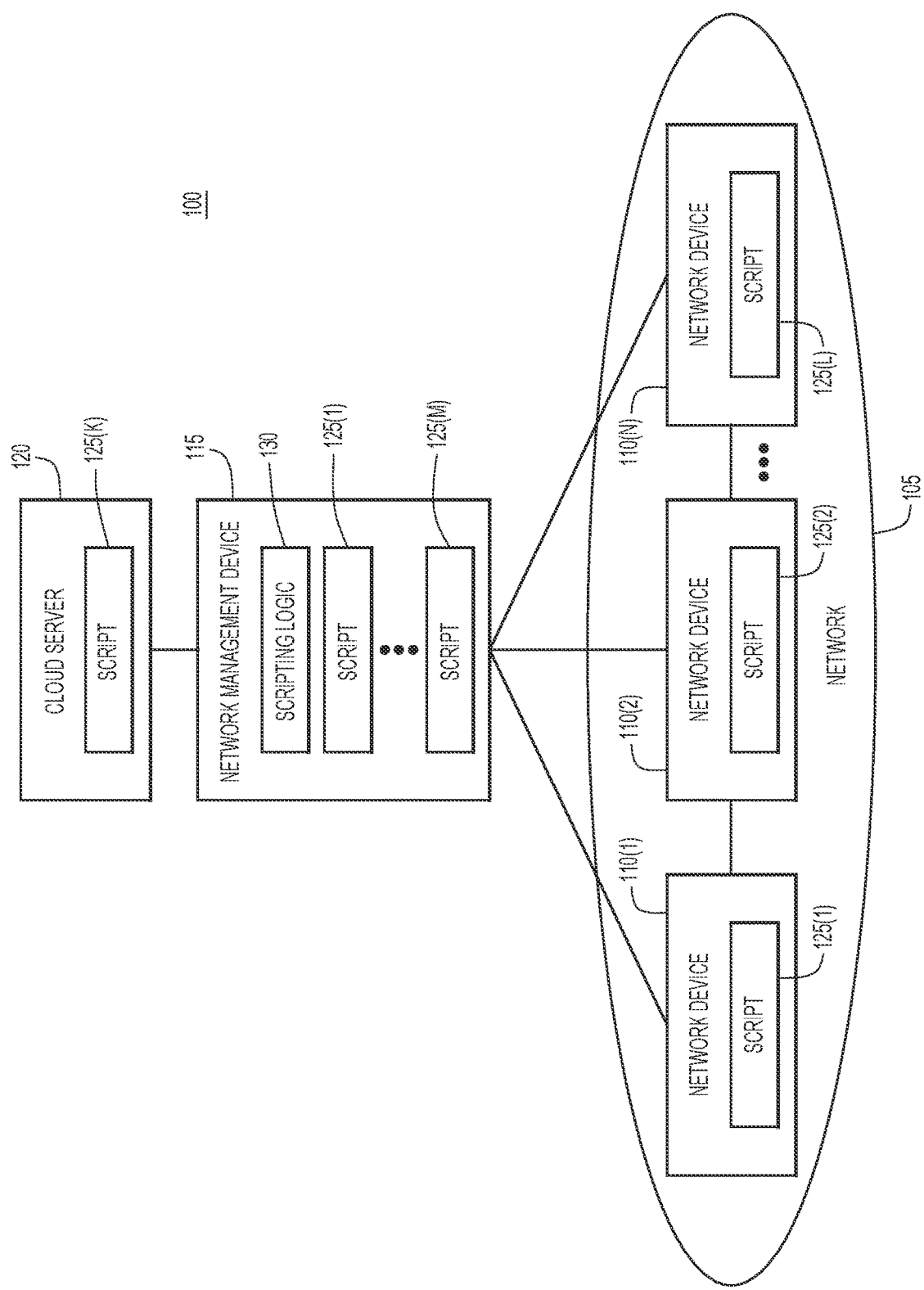
FIG. 1 illustrates a system for detecting a security threat to a network, according to an example embodiment.

FIG. 1 illustrates an example system 100 for detecting a security threat to a network 105 including network devices 110(1)-110(N). System 100 includes network 105, network management device 115, and optionally a cloud server 120. Network management device 115 includes scripts 125(1)-125(M), which may be written by a user/network administrator/security analyst in communication with the network management device 115. Scripts 125(1)-125(M) may be queries that define one or more functions for detecting customizable network events relating to the security threat to network 105. Scripts 125(1)-125(M) may also be referred to herein as a "play." A set of scripts to detect a multi-stage security threat may be referred to herein as a "playbook".

Conventional threat hunting involves collecting large amounts of redundant data. Data is collected and sent to a central location, where the user runs a playbook on all the collected data to detect a security threat, if any. In large organizations with a very high volume of alerts and log data, such data is rarely of any use unless the data is directly connected to a play in a playbook or helps establish related context to some event returned by the execution of a play. Moreover, plays are typically restricted to gleaning and collecting context and useful threat indicators based on the data that has been collected. In other words, the data plane sends information for analysis regardless of relevance to the threat/play. In addition, the plays are limited to collecting data that may not have the context required to identify a threat or increase the fidelity of some weak threat indicators from a security device.

Therefore, instead of taking the conventional blanket approach to data collection where data is collected without considering whether that data is useful, a more intelligent approach is provided herein where network devices 110(1)-110(N) selectively execute scripts and collect relevant data. Network devices 110(1)-110(N) comprise a programmable data plane that allows the user to script data collection, filtering, and processing operations on streaming network data, thereby permitting collection of only relevant data. To this end, the network management device 115 includes scripting logic 130 to hierarchically activate scripts 125(1)-125(M) in the network data plane of network devices 110(1)-110(N).

Scripts 125(1)-125(M) may be activated (or deactivated) based on certain conditions resulting from analyzing data collected from previously activated scripts at the network management device 115. Such conditions may include thresholds of computed parameters such as time, location, role, event, etc. Hence, the network data plane allows users to collect secondary contextual data from other data sources (e.g., device and application logs, device to user mappings, geo-location, etc.) to help investigate the primary indicators of the scripts. The activated script may cause the network device to collect raw, pre-processed, and/or filtered data targeted for that script. The network management device 115 may consume and visualize the collected data to enable the user to make informed decisions regarding the security of the network. The user, based on his or her expertise and possibly through the aid of a learning component, may decide to push and enable the next script or set of scripts on the network data plane to collect relevant data useful for subsequent decision making.

Scripts 125(1)-125(M) may be written in a language supported by the network data plane of the network devices 110(1)-110(N) (e.g., a Turing complete language). It will be appreciated that some playbooks (e.g., for detecting different threats) may share one or more of the same scripts 125(1)-125(M). Network management device 115 may comprise a centralized controller for orchestration, management, and correlation that has the capability to push scripts 125(1)-125(M) to the network data plane and activate/deactivate the scripts 125(1)-125(M) as needed over the network data plane on various devices (e.g., email security appliances, web security appliances, Intrusion Prevention Systems (IPSs), etc.).

The network management device 115 may initially push a set of fundamental scripts (e.g., chosen by a user as a first step in a playbook) to the sensors/network devices 110(1)-110(N) over the network data plane. The fundamental scripts are thus activated and cause the network devices 110(1)-110(N) to begin collecting and exporting data required for various playbooks. The initial set of scripts may be the first plays in each playbook whose results are useful for further investigation of certain playbooks. Upon receiving data from the data plane for each of the scripts 110(1)-110(N), the user may analyze the data and decide whether further investigation is warranted. This analysis may also be automated as part of the playbook because the playbooks themselves are programmable.

Once any of the scripts confirms a certain suspicious activity, the next set of scripts relevant for that playbook may be pushed to the network devices 110(1)-110(N) to activate those scripts. This expansion of this decision tree continues until the playbook is complete, meaning that the data collection required for that script has been performed and all the relevant data has been exported to the network management device 115 for further investigation and decision making. Once proper decisions have been made for the activated plays on the network data plane based on the collected data, and after there is no more need for the scripts to continue running, the scripts may be deactivated to reduce the overhead on network data plane.

In one example, network management device 115 generates script 125(1). Script 125(1) may define a first function for detecting a first customizable network event in a sequence of customizable network events indicative of a security threat to network 105. Network management device 115 may activate (e.g., distribute) script 125(1) at network device 110(1) so as to cause network device 110(1) to execute the first function for detecting the first customizable network event. Network management device 115 may obtain, from network device 110(1), one or more indications that network device 110(1) has detected the first customizable network event.

Based on those indications, network management device 115 may determine whether to activate script 125(2) defining a second function for detecting a second customizable network event in the sequence at network device 110(2) capable of detecting the second customizable network event. The network management device 115 may make this determination, for instance, based on whether one or more statistics associated with the one or more indications exceed a threshold. This determination is an improvement over conventional techniques because network management device 115 may intelligently activate hierarchical scripts instead of blindly collecting mass amounts of data.

In one example, the network management device 115 may refrain from activating the second script at network device 110(2) based on the one or more indications. In another example, the network management device 115 may activate the second script at network device 110(2) so as to cause network device 110(2) to execute the second function for detecting the second customizable network event. In this example, the network management device 115 may obtain, from the one or more network devices 110(1)-110(N), one or more indications that the one or more network devices 110(1)-110(N) have detected the second customizable network event. This process may continue and, for example, script 125(L) may be activated on network device 110(N). It will be appreciated that network management device 115 may activate the same or different scripts at any time (e.g., simultaneously, sequentially, etc.) at any of one or more of network devices 110(1)-110(N), including one or more of the same network devices 110(1)-110(N).

Figure 2:
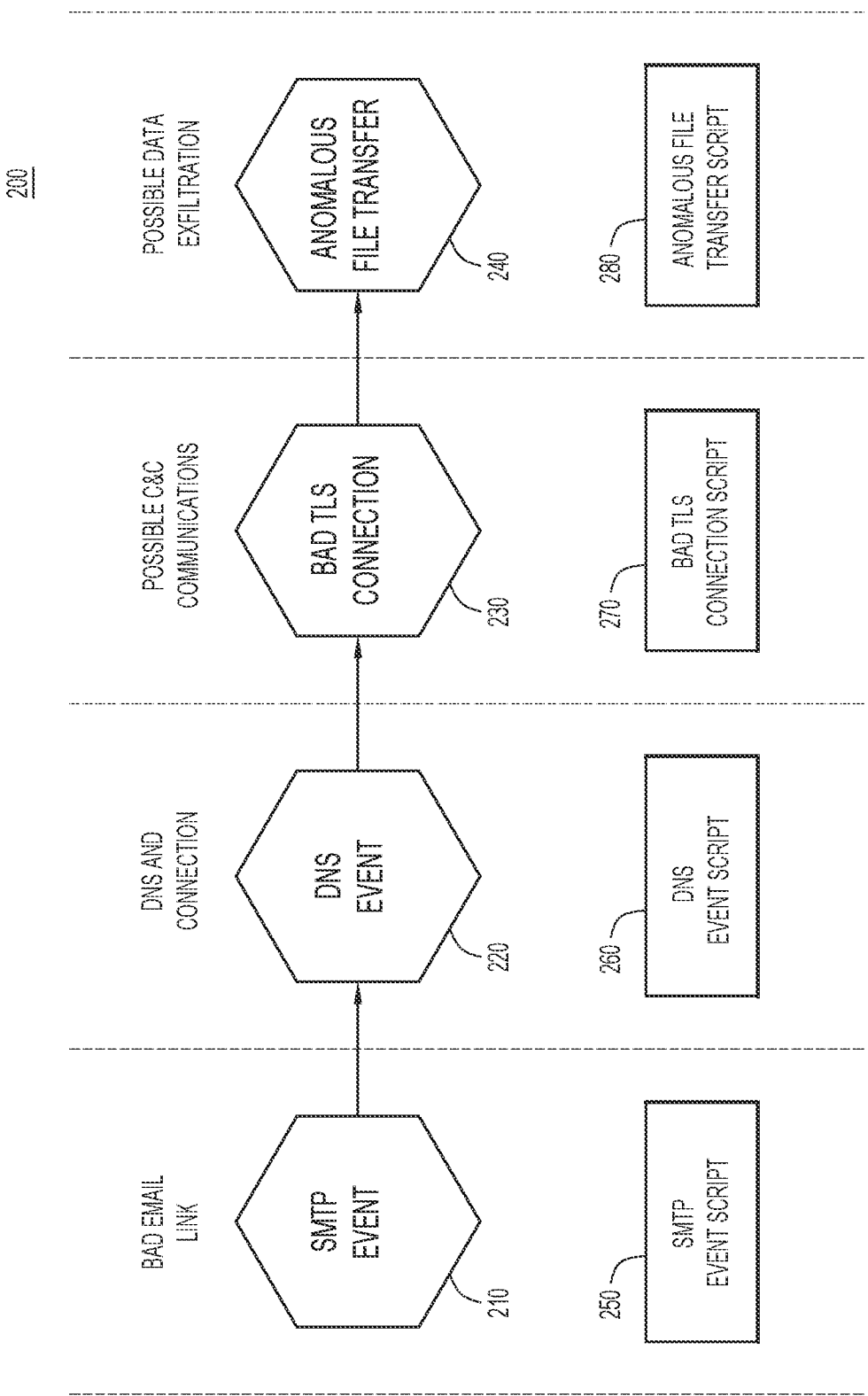
FIG. 2 illustrates a security threat to a network, according to an example embodiment.

FIG. 2 illustrates an example security threat 200 to network 105. Security threat 200 is a sequence of network events 210-240 that leads to exfiltration of (possibly confidential/sensitive) data. At 210, an attacker sends a bad/suspicious link in an email to a user of one of network devices 110(1)-110(N). If the user selects/clicks the link, at 220 a Domain Name System (DNS) event occurs whereby one of the network devices 110(1)-110(N) connects to a malicious attacker. At 230, the attacker establishes a bad/insecure Transport Layer Security (TLS) connection and initiates command-and-control (C&C) communications. At 240, the attacker exfiltrates confidential and/or sensitive data.

Conventionally, security threat 200 would be detected by deploying plays to network devices 110(1)-110(N) before security threat 200 exists to cause the network devices 110(1)-110(N) to gather data relevant to each network event 210-240, as well as data that is irrelevant to security threat 200. By contrast, network management device 115 may activate script 125(1) (e.g., at network device 110(1)) to cause network device 110(1) to detect network event 210. If network device 110(1) detects network event 210, network management device 115 may activate script 125(2) (e.g., at network device 125(2)) to detect network event 220. If network device 110(1) does not detect network event 210, network management device 115 may refrain from activating script 125(2).

More specifically, the network management device 115 may generate respective scripts 250-280 for each network event 210-240. Scripts 250-280 together may form a "playbook" to detect security threat 200, and may cause network devices to collect relevant data specific to security threat 200. For instance, a Simple Mail Transfer Protocol (SMTP) event script 250 may cause a network device to detect a bad email link (e.g., based on user, host, etc.). When the bad email link is detected, the network management device 115 may activate a DNS event script 260 to cause a network device to detect suspicious/malicious DNS communications (e.g., based on user, host, Uniform Resource Identifier (URI), server, etc.). When the suspicious/malicious DNS communication is detected, the network management device 115 may activate a bad TLS connection script 270 to cause a network device to collect data relevant to possible C&C communications. Finally, when the C&C communications are detected, the network management device 115 may activate an anomalous file transfer script 280 to collect data relevant to possible data exfiltration (e.g., based on user, file, geographical location, etc.). Thus, the user may write targeted scripts for data collection that is relevant to the particular network events 210-240 instead of searching a large list of network event logs for data that is relevant to the security threat 200. In a further example, a data lake may be used for retrospective analysis of security threat 200.

Figure 3A:
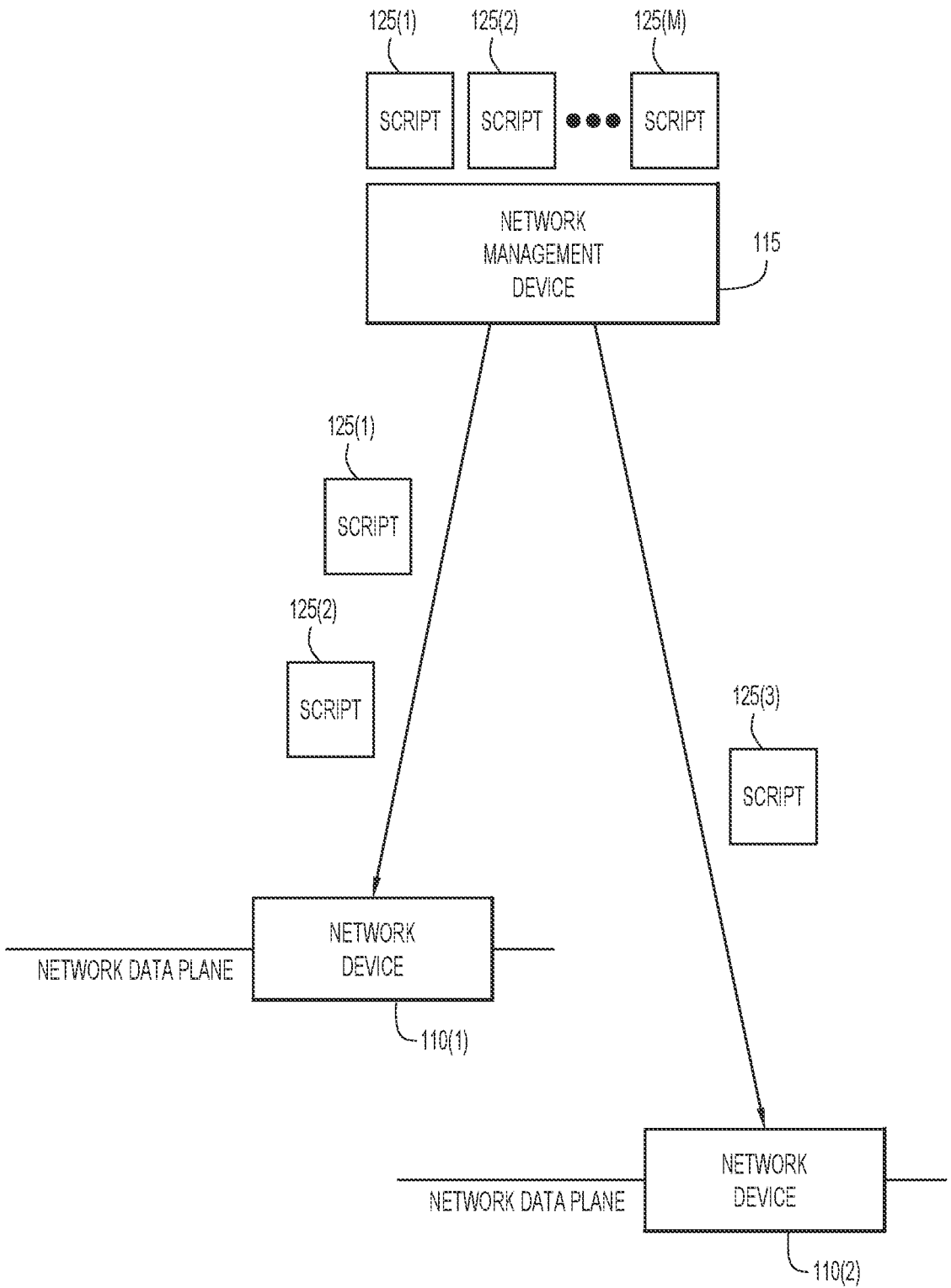
FIGS. 3A-3D illustrate hierarchical activation of scripts to detect a security threat to a network, according to an example embodiment.

FIGS. 3A-3D illustrate the hierarchical activation of scripts 125(1)-125(M) to detect a security threat to network 105. Scripts 125(1)-125(M) each include at least one respective function for detecting respective network events. In FIG. 3A, network management device 115 distributes scripts 125(1) and 125(2) to network device 110(1), and script 125(3) to network device 110(2). This causes network device 110(1) to execute functions for detecting network events corresponding to scripts 125(1) and 125(2), and network device 110(2) to execute the function for detecting the network event corresponding to script 125(3).

Figure 3B:
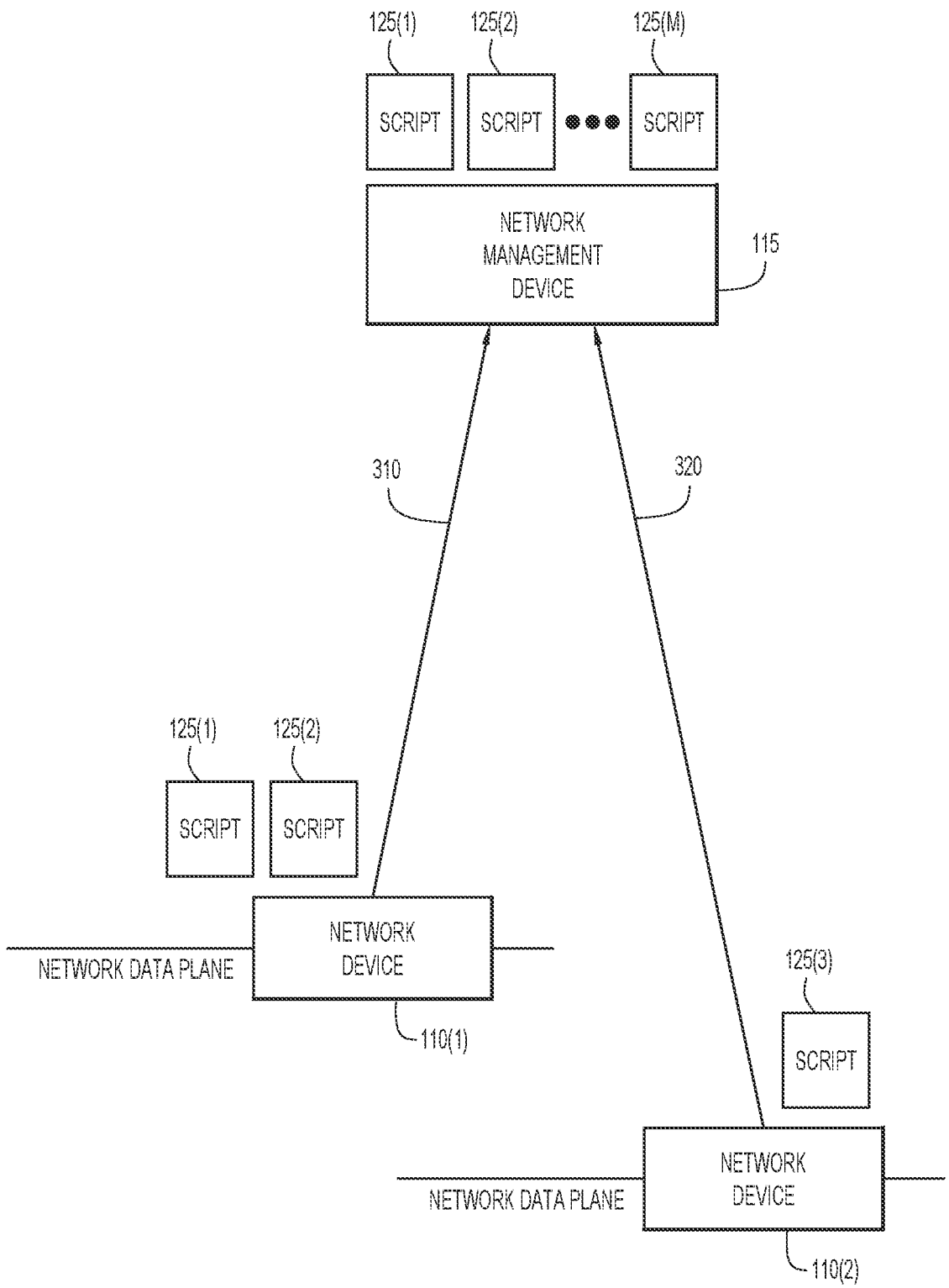

In FIG. 3B, network management device 115 obtains, from network device 110(1), one or more indications 310 that network device 110(1) has detected the network event(s) corresponding to activated scripts 125(1) and 125(2). Network management device 115 also obtains, from network device 110(2), one or more indications 320 that network device 110(2) has detected the network event corresponding to activated script 125(3). Network management device 115 determines, based on indications 310 and 320, whether to activate further scripts 125(4)-125(M). Here, network management device 115 activates further scripts 125(4)-125(M).

Figure 3C:
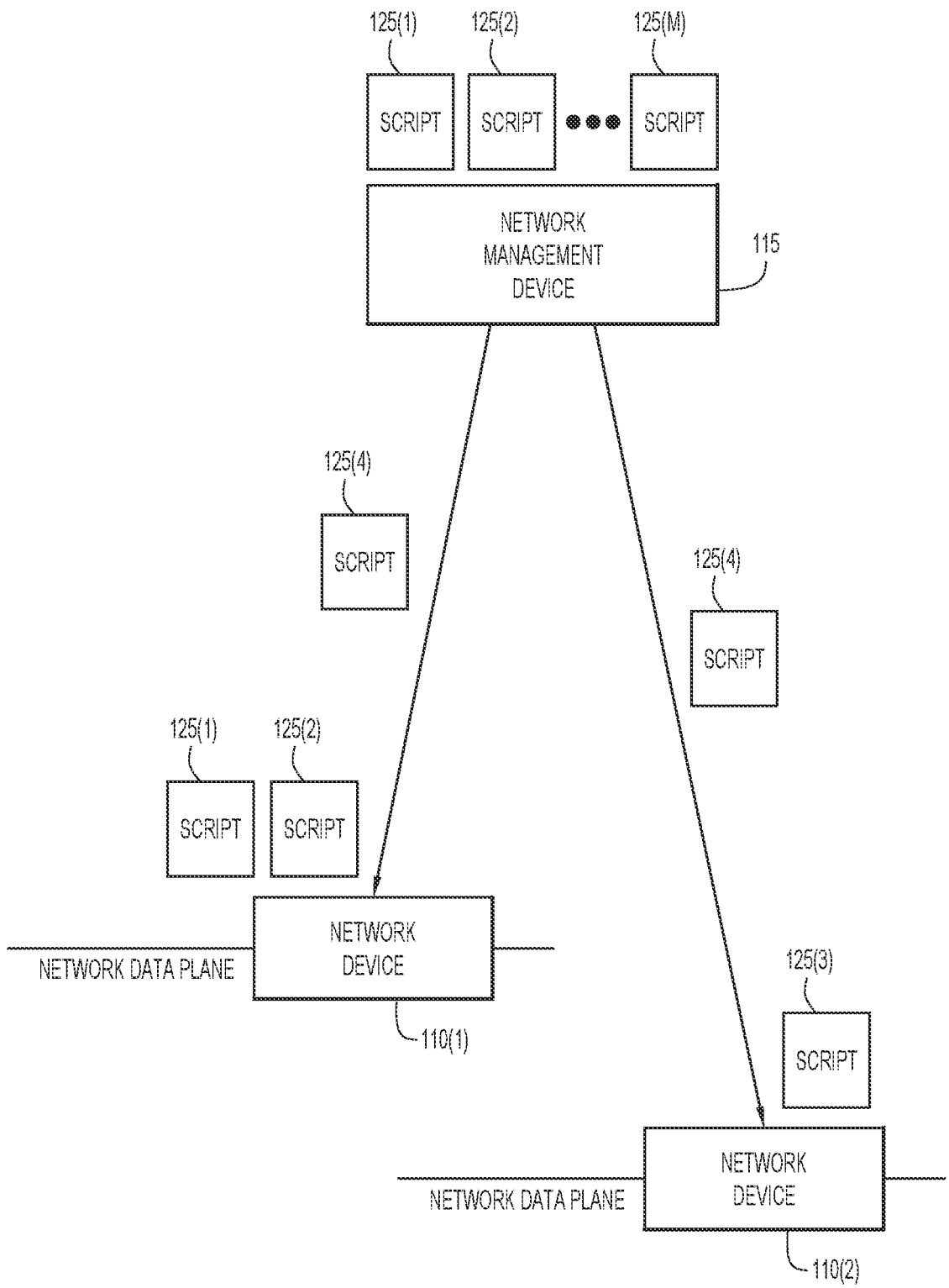
Figure 3D:
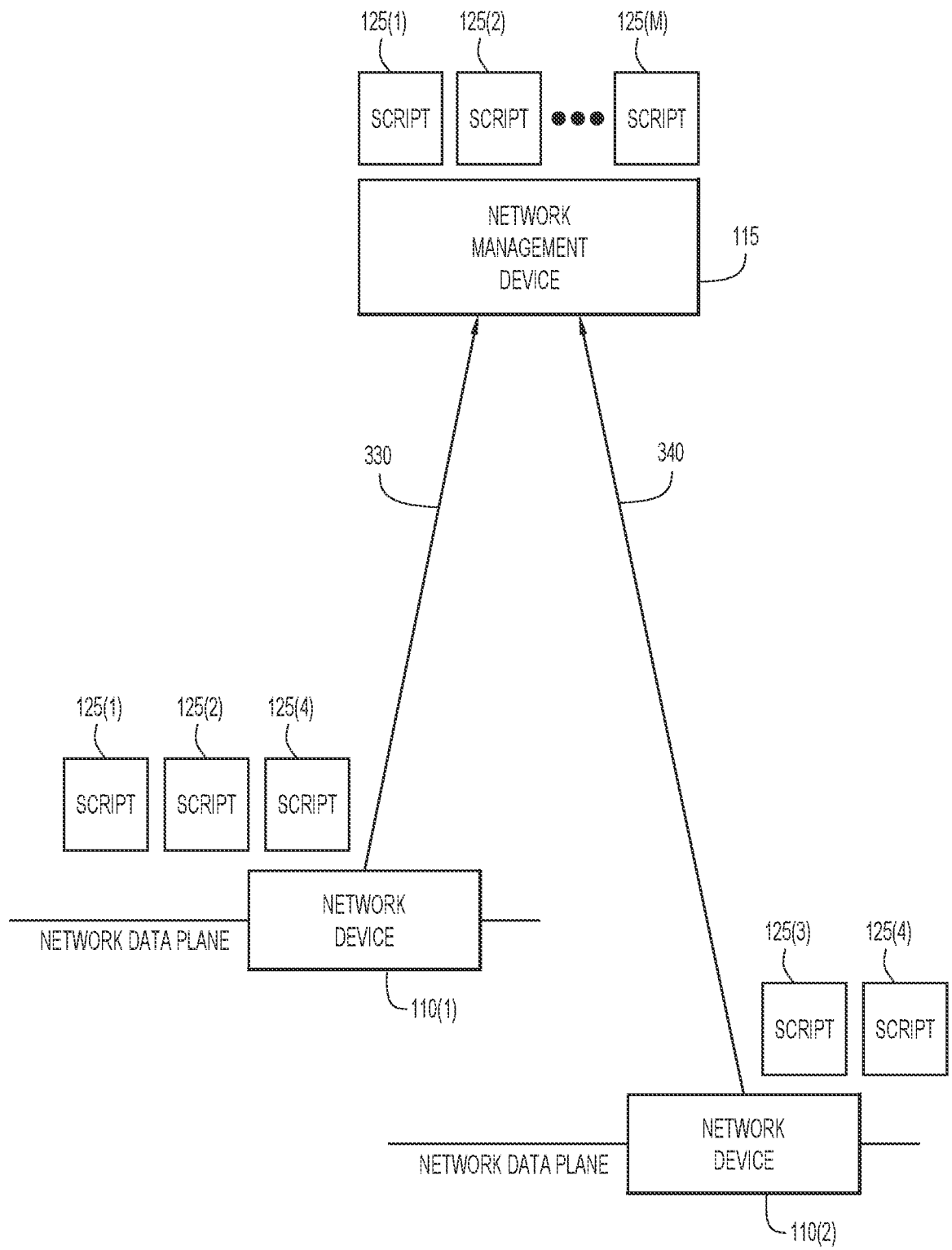

In FIG. 3C, network management device 115 distributes script 125(4) to network devices 110(1) and 110(2) based on indications 310 and 320 and, optionally, input from the user. This causes network devices 110(1) and 110(2) to execute functions for detecting a network event corresponding to script 125(4). In FIG. 3D, network management device 115 obtains, from network devices 110(1) and 110(2), one or more indications 330 and 340 that network devices 110(1) and 110(2) have detected the network event corresponding to activated script 125(4). This process may continue until the entire set of scripts 125(1)-125(M) in the playbook has been activated and the data required for each of the scripts 125(1)-125(M) is collected. In one example, the network management device 115 displays a representation of the one or more indications (e.g., in a Graphical User Interface (GUI)) for the user to take corrective action against the security threat.

Programmable collection of only relevant data for plays addresses the need for an effective, intelligent, proactive, and automated threat hunting system for the next generation of Security Operation Centers (SOCs) to perform cost-effective intelligent threat hunting. Techniques described herein enable the capability to program the network data plane to collect/pre-process/filter for a specific script in a playbook in near-real-time. Moreover, by programming the network data plane for various scripts in the playbook, security experts may apply hierarchical logic to selectively activate scripts on the network data plane under certain specified conditions (e.g., based on data collected from the previous scripts in the playbook). This enables SOCs and incident response teams to effectively, intelligently, proactively, and automatically perform threat hunting tasks, thereby permitting users to balance time and effort during various stages of the incident investigation for a faster resolution.

A hybrid configuration and programmability approach is described herein. The programmable network data plane allows a rich configuration language for effectively extracting, filtering and applying fixed pre-processors on the network traffic and allowing programmability only within a physically constrained (and isolated) sandbox-like environment. The initial filtering and pre-processing may minimize the amount of traffic that needs to be processed by the network device. This sandboxing approach also helps constrain the resource and access of the code. Moreover, the programmed scripts may be conditionally activated by specified network devices, thus allowing the programmability to be defined as a hierarchically complex function where only a very small fraction of network traffic needs to be processed by the most complex function.

This is an effective design for a network data plane designed for threat detection use cases because threat detection behaviors can generally be expressed as a hierarchical set of indicators (e.g., a chain of micro behaviors/plays). For example, as part of a playbook for identifying a compromised endpoint, one of the scripts may cause a network device to look up the Indication of Compromise (IoC) Internet Protocol (IP) addresses in the data packets on the network data plane. Upon finding such IP addresses, the next script may cause a network device to verify whether the file hash IoC has already been processed and, if so, retrieve the malicious files for further analysis.

Hence, the user may program the network data plane for the first script and activate the network device on the network data plane to collect the relevant data. Next, once the existence of those malicious IP addresses is confirmed by the user who received the collected data, the user may push and activate the next script to locate the endpoints that might have been compromised by communicating and receiving malicious files from those malicious IP addresses. The pushing and activating of the next script may also occur automatically. A user and/or network management device 115 may decide whether the second play is necessary by investigating the results of the first script and activating the next script if needed for further investigation.

Techniques described herein provide programmability useful for flexible, targeted, and efficient threat hunting. This is a paradigm shift from the playbook being a function of collected data to data being collected as a function of a playbook. This allows more efficient data collection in the enterprise by collecting only data that is useful for threat hunting. Moreover, users frequently reach dead ends while researching alerts due to the lack of contextual data in conventional approaches. As described herein, collecting the context useful for threat hunting may be programmable.

Each script in a playbook relates to one or more network events, the detection of which involves relations and conditions relevant to the script. Each playbook is associated with a collection of network events for a specific threat. A programmable data plane is provided that allows users to script various plays and the relations and conditions among them to detect a threat. Scripts may be executed in a distributed fashion and in different parts of network to collect and process relevant data for a particular threat. Targeted execution of scripts of various playbooks in various parts of the network is beneficial because this significantly reduces the required time and resources for detecting security threats. This also enables a more dynamic and interactive threat hunting process.

Figure 4:
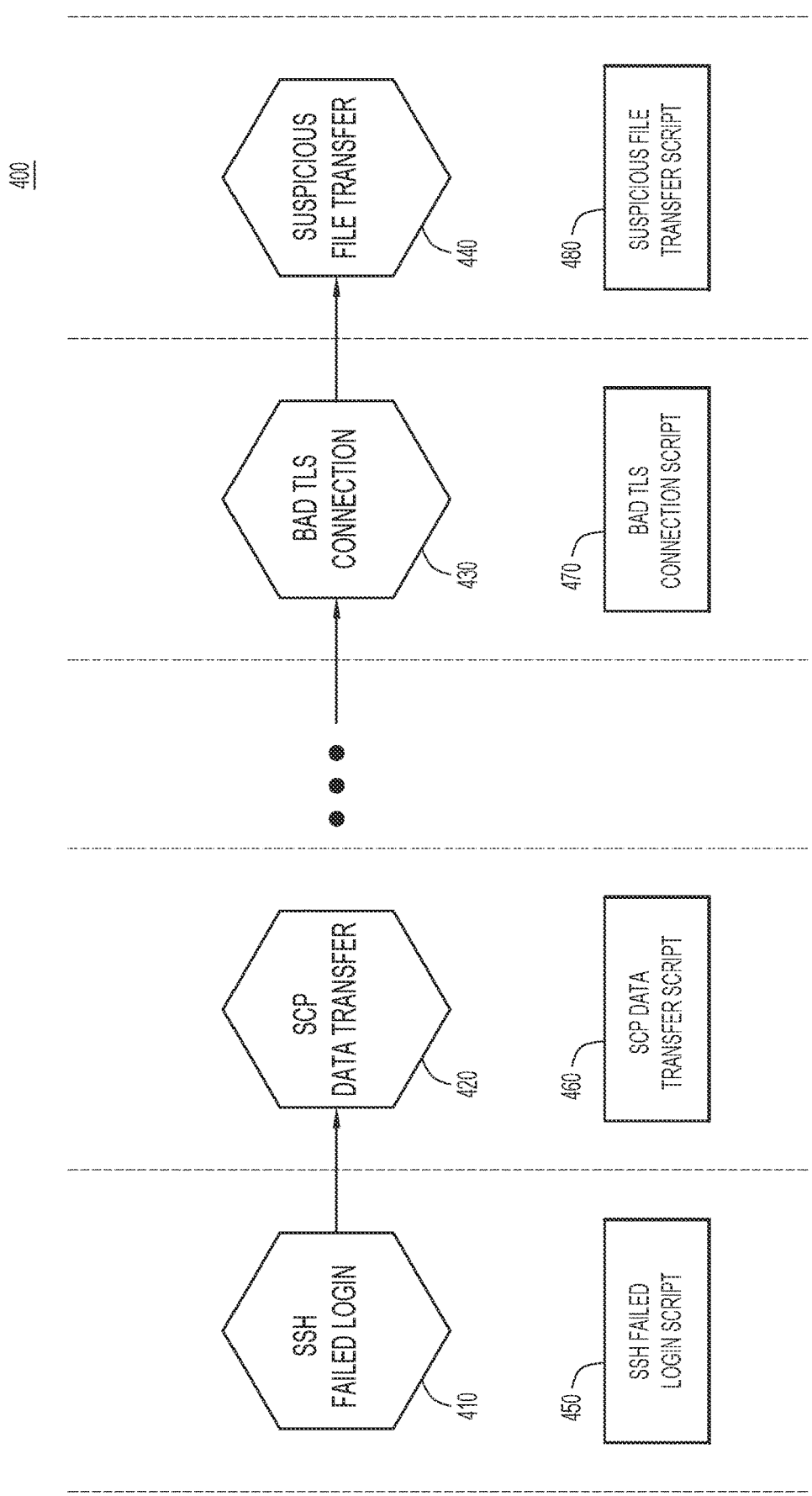
FIG. 4 illustrates another security threat to a network, according to an example embodiment.

FIG. 4 illustrates another example security threat 400 to network 105. Security threat 400 is a sequence of at least network events 410-440 that leads to exfiltration of (possibly confidential/sensitive) data. At 410, an attacker initiates a brute-force Secure Shell (SSH) attack. Brute-force SSH attacks typically have a large number of associated SSH failed login attempts. The SSH attack may be slow enough to evade brute-force SSH attack detection thresholds yet nonetheless successfully establish an SSH connection with the server storing sensitive data (e.g., a finance server). At 420, the attacker uses Secure Copy (SCP) to transfer the sensitive data. At 430, the attacker establishes a bad/insecure TLS connection, and at 440, the attacker initiates an anomalous file transfer to servers in rogue countries (e.g., within three minutes of network event 410).

The network management device 115 may generate respective scripts 450-480 for each network event 410-440. Scripts 450-480 together may form a "playbook" to detect security threat 400, and may cause network devices to collect relevant data specific to security threat 400. For instance, an SSH failed login script 450 may cause a network device to detect SSH failed login 410. When the SSH failed login is detected, the network management device 115 may activate an SCP data transfer script 460 to cause a network device to detect SCP data transfer 420. When the SCP data transfer 420 is detected, the network management device 115 may activate a bad TLS connection script 470 to cause a network device to detect bad TLS connection 430. Finally, when bad TLS connection 430 is detected, the network management device 115 may activate suspicious file transfer script 480 to detect suspicious file transfer 440.

It is difficult to determine whether a particular SSH login attempt has failed using conventional approaches. This is because after the initial TLS exchange, the actual connection setup messages are encrypted. Therefore, it is unknown whether the password provided by the user was successful. One way to estimate whether an SSH login attempt was successful is to use heuristics (e.g., the amount of data transferred over the connection since the login attempt was made). Network events 410 and 440 may be manually or automatically customizable according to such heuristics. In one example, the user may manually write or implement a script defining/refining network events 410 and 440. In another example, the network management device 115 may cause cloud server 120 to automatically define/refine network events 410 and 440. For instance, the network management device 115 may include script 125(K) that defines a function for processing data associated with network event 410 to assist network device 110(1) in detecting network event 410. In this example, the network management device 115 activates script 125(K) at cloud server 120 so as to cause cloud server 120 to execute that function.

In a further example, cloud server 120 may receive data associated with SSH login attempts from various network devices both internal and external to network 105. Cloud server 120 may aggregate and/or process this data to determine when an SSH login attempt has failed based on whether the data is above or below a certain threshold. The cloud server 120 may determine that threshold and provide an indication of the threshold to the network device 110(1) (e.g., via network management device 115) to set the threshold on the network device 110(1). Based on the indication of the threshold, the network device 110(1) may provide indications of network event 410 to network management device 115 only when the data indicates that the SSH login attempt has failed (e.g., when the data is above or below the threshold). This may improve both the accuracy of detection of security threat 400 and bandwidth and computing resource utilization in network 105.

FIG. 5 illustrates an example script 500 for detecting network event 410 (e.g., SSH failed login script 450). Script 500 includes a timed callback function list 510, observation list 520, threshold function 530, and export function 540. The timed callback function list 510 causes the threshold and export functions 530 and 540 to be called every thirty seconds. The observation list 520 causes network device 110(1) (or any network device on which the script 500 is activated) to detect SSH login attempts. Observation list 520 also causes network device 110(1) to detect a heuristic related to failed SSH login attempts, specifically the total number of bytes on port 22 (which is allocated for SSH logins). Threshold function 530 may cause the network device 110(1) to receive one or more indications from a cloud server 120 regarding whether to report a network event 410 (e.g., whether a given SSH login attempt has failed). The threshold function may, for example, be based on a threshold of the heuristic defined in the observation list 520.

Export function 540 causes the network device 110(1) to export indications of collected data/statistics to the network management device 115 and/or cloud server 120 for deploying a distributed programmable threat hunting use case. In one example, export function 540 may cause the network device 110(1) to send, to the network management device 115, one or more probabilities of occurrences of network event 410 at the network device 110(1). Probabilistic network events provide a much richer set of semantics to express behaviors in terms of statistical inference. For example, data gathered by the network device 110(1) may indicate that there is a percentage chance (e.g., 50%, 75%, etc.) that network event 410 actually occurred. This may be based, for example, on an amount of data that is transferred after the SSH login attempt, total bytes on port 22, etc.

Figure 6:
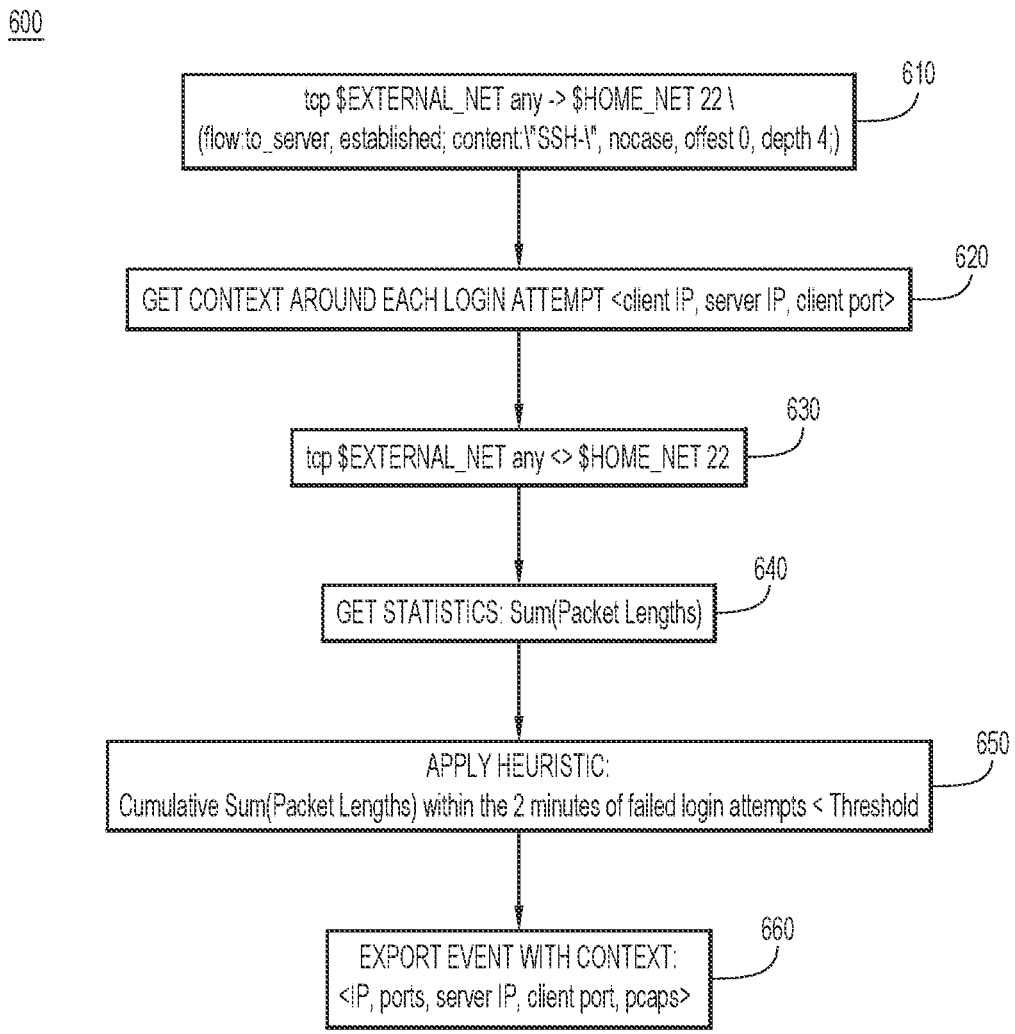
FIG. 6 illustrates a flow chart of a method for a network device to detect a configurable network event according to the script of FIG. 5, according to an example embodiment.

FIG. 6 illustrates an example method 600 for network device 110(1) to detect network event 410 according to script 500. At 610, the network device 110(1) detects a certain number of SSH login attempts (both successful and failed). The network device 110(1) may make this determination based on, for example, a Deep Packet Inspection (DPI) Intrusion Prevention System (IPS) signature. At 620, the network device 110(1) obtains relevant context to enrich each login attempt (e.g., client IP address, server IP address, and client port). At 630, the network device 110(1) detects the total number of SSH related communication packets on port 22.

At 640, the network device 110(1) gathers statistics in accordance with observation list 520 (specifically, the total number of bytes on port 22) using, for example, a streaming statistics engine. At 650, the network device 110(1) applies the heuristic according to threshold function 530. Specifically, the network device 110(1) filters out any SSH login attempts having a total number of bytes on port 22 (e.g., cumulative sum of packet lengths on port 22) below some threshold within two minutes of the corresponding SSH login attempt. The cloud server 120 may determine the threshold using a machine learning process. Another example of a heuristic is an amount of data transferred after a login attempt (e.g., a minimum threshold amount of data transfer may be expected after a successful SSH login). At 660, the network device 110(1) exports network event(s) 410, contextual information, and/or probabilities of occurrence of network event(s) 410 according to export function 540.

Figure 7:
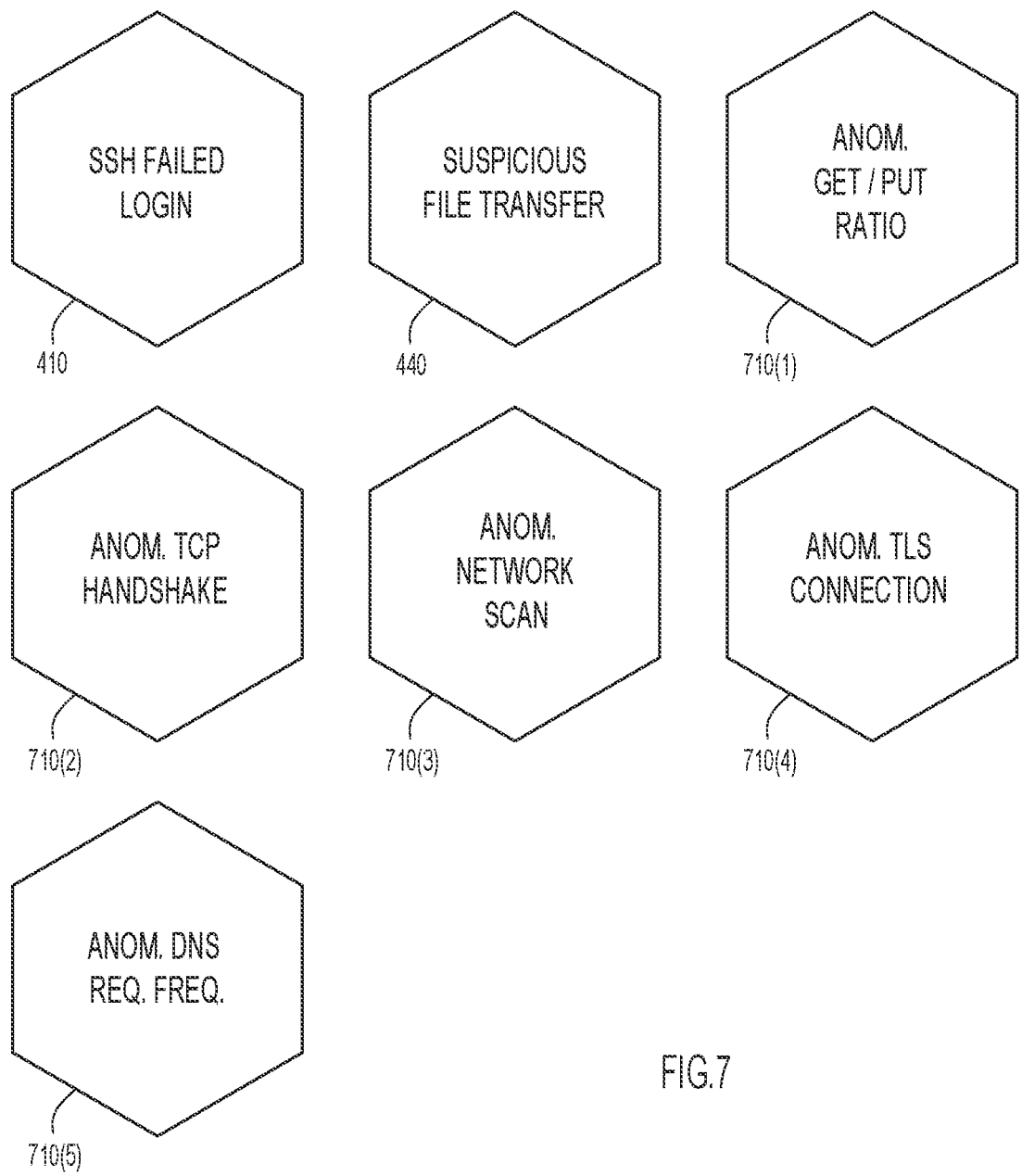
FIG. 7 illustrates a Graphical User Interface (GUI) for selecting a configurable network event for detection by a network device, according to an example embodiment.

Even if it is determined whether an SSH login attempt failed, conventional techniques may not be able determine which network events 410-440 comprise a security threat. For example, some SSH failed logins are not malicious, and may simply be caused by a user typo in the password. By observing network event 410 in combination with other network events (e.g., network event 440), it may be determined which of the SSH failed login attempts are malicious. For example, observing a suspicious file transfer (network event 440) shortly after an SSH failed login (network event 410) may indicate that a hacker has correctly guessed the password and the SSH failed login is therefore malicious. Accordingly, FIG. 7 illustrates a Graphical User Interface (GUI) for selecting one or more network events for detection by a network device (e.g., network device 110(1)). As shown, a user may choose one or more of a plurality of network events, including network events 410, 440, and 710(1)-710(5). In this example, the user selects (e.g., clicks) network events 410 and 440 for detection by a network device.

Figure 8:
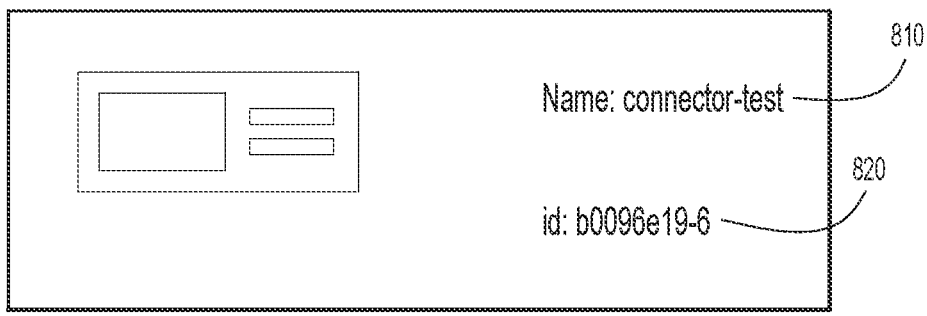
FIG. 8 illustrates a GUI for selecting a network device to detect a configurable network event, according to an example embodiment.

FIG. 8 illustrates a GUI for selecting the network device to detect network events 410 and 440, described above in connection with FIG. 4. The network device is identified by a name 810 and ID 820. The network device may be, for example, network device 110(1). Although only one network device is shown in FIG. 8, it will be appreciated that a user may select (e.g., click) any suitable number of network devices to detect any suitable number of network events. When the user selects network events 410 and 440 and network device 110(1) in the GUIs of FIGS. 7 and 8, the network management device 115 pushes one or more scripts to network device 110(1). The script(s) cause network device 110(1) to detect network events 410 and 440. For example, to detect network event 440, network device 110(1) may accumulate key value pairs over time, apply thresholds on the pairs, and export a list of suspicious clients.

Figure 9:
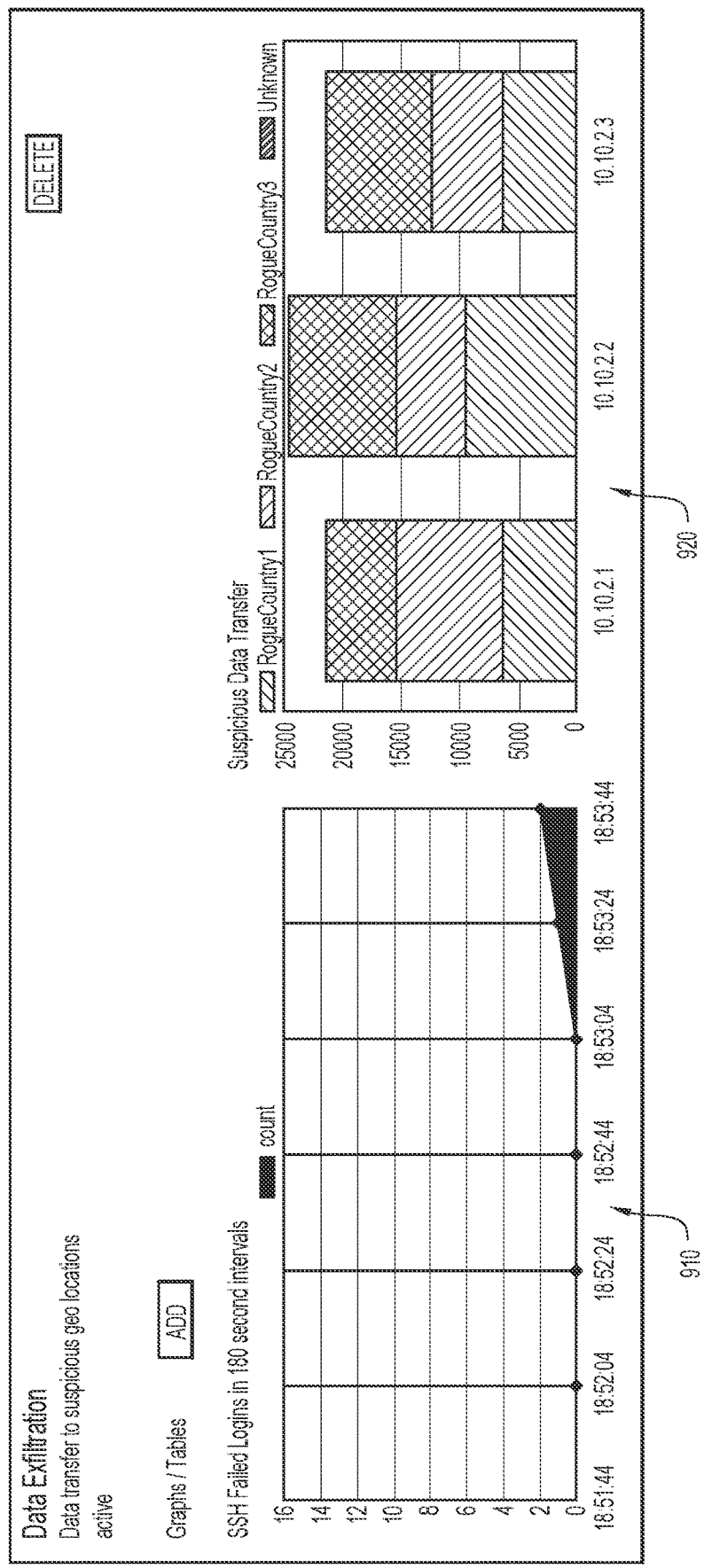
FIG. 9 illustrates a GUI displaying detected configurable network events, according to an example embodiment.

FIG. 9 illustrates a GUI displaying detected network events 410 and 440, described above in connection with FIG. 4. The network management device 115 may generate the GUI of FIG. 9 after receiving one or more indications from network device 110(1) that network device 110(1) has detected network events 410 and 440. The GUI includes graph 910 and chart 920. Graph 910 indicates detected network event 410 (malicious SSH failed logins) over time, and chart 920 indicates detected network event 440 (suspicious file transfers) from three sources (IP addresses 10.10.2.1, 10.10.2.2, and 10.10.2.3) to three suspect destinations (RogueCountry1, RogueCountry2, and RogueCountry3). A user may take corrective action based on the information conveyed by the GUI in FIG. 9. Additionally/alternatively, the network management device 115 may automatically take corrective action to address the security threat 400.

It will be appreciated that different network devices may detect various network events in other examples (e.g., network devices 110(1)-110(2) may detect network event 410, network device 110(2) may detect network event 420, network devices 110(2)-110(4) may detect network event 430, etc.). The GUIs of FIGS. 7-9 may be displayed/hosted at network management device 115.

Figure 10:
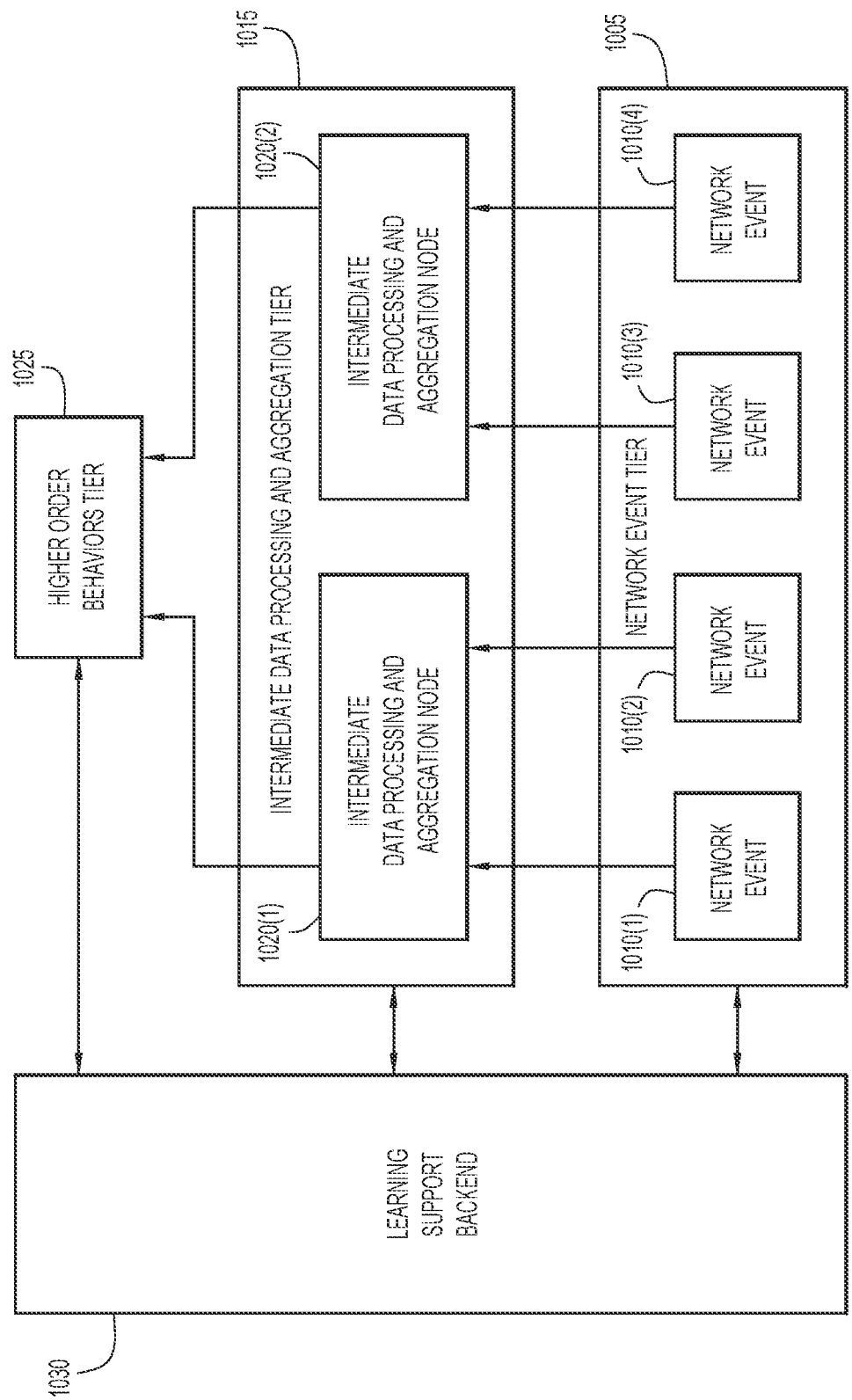
FIG. 10 illustrates a high-level diagram of a pipeline for detecting a security threat to a network, according to an example embodiment.

FIG. 10 illustrates a high-level diagram of a pipeline for detecting a security threat to a network. Briefly, this approach comprises a network event tier 1005 including network events 1010(1)-1010(4), an intermediate data processing aggregation tier 1015 including intermediate data processing and aggregation nodes 1020(1) and 1020(2), and a higher order behavior tier 1025. A learning support backend 1030 is in communication with one or more of tiers 1005, 1015, and 1025.

Network devices in a data plane may generate network events 1010(1)-1010(4) by aggregating and processing data streams across both space (packets, flows, sessions, user-groups, etc.) and time to reveal patterns of interest. The network devices then export network events 1010(1)-1010(4) to intermediate data processing and aggregation tier 1015. Network events 1010(1) and 1010(2) are processed and aggregated at intermediate data processing and aggregation node 1020(1), and network events 1010(3) and 1010(4) are processed and aggregated at intermediate data processing and aggregation node 1020(2). The higher order behavior tier 1030 collects the data from intermediate data processing and aggregation nodes 1020(1) and 1020(2). The higher order behavior tier 1030 may produce, through a series of enrichments, aggregations, and processing at the different levels of the pipeline, behavioral models based on the network events 1010(1)-1010(4) for evaluation.

Learning support backend 1040 may provide refinements to data collection/processing at one or more of tiers 1005, 1015, and 1025. A user may define learning support backend 1040 to aid the processing of a network event at a given stage in the pipeline. Since network events may be probabilistic in nature, the learning support backend 1040 may continuously learn baseline parameters related to the generation of a network event and dynamically set threshold values to reduce false positives, thereby improving the accuracy of the system.

The number of tiers of the pipeline and the exact definition of a network event/higher order behavior may depend on the definitions provided by the user. The pipeline may provide a programmatic abstraction to the user to define complex behavioral patterns over network data streams. The system may automatically instantiate the data processing pipeline to continuously search the network data streams for these behavioral patterns in near-real time. For example, network events 1010(1)-1010(4) may correspond to network events 410-440. At network event tier 1005, network devices 110(1)-110(N) may determine which SSH login attempts are failed (e.g., based on a threshold of a number of bytes on port 22). Once the SSH login attempts are detected and exported, the network management device 115 may perform intermediate data processing at intermediate data processing and aggregation node 1020(1) (e.g., determining that many failed SSH login attempts occurred within a certain amount of time). Finally, at higher order behavior tier 1025, the network management device 115 may determine which failed SSH login attempts are malicious based on the timing of suspicious file transfers (e.g., determined at intermediate data processing and aggregation node 1020(2)). The learning support backend 1030 may correspond to cloud server 120 running script 125(K), which may assist network devices in detecting network events 1010(1)-1010(4) and provide further refinements to data processing/aggregation and identifying higher-order behaviors.

Figure 11:
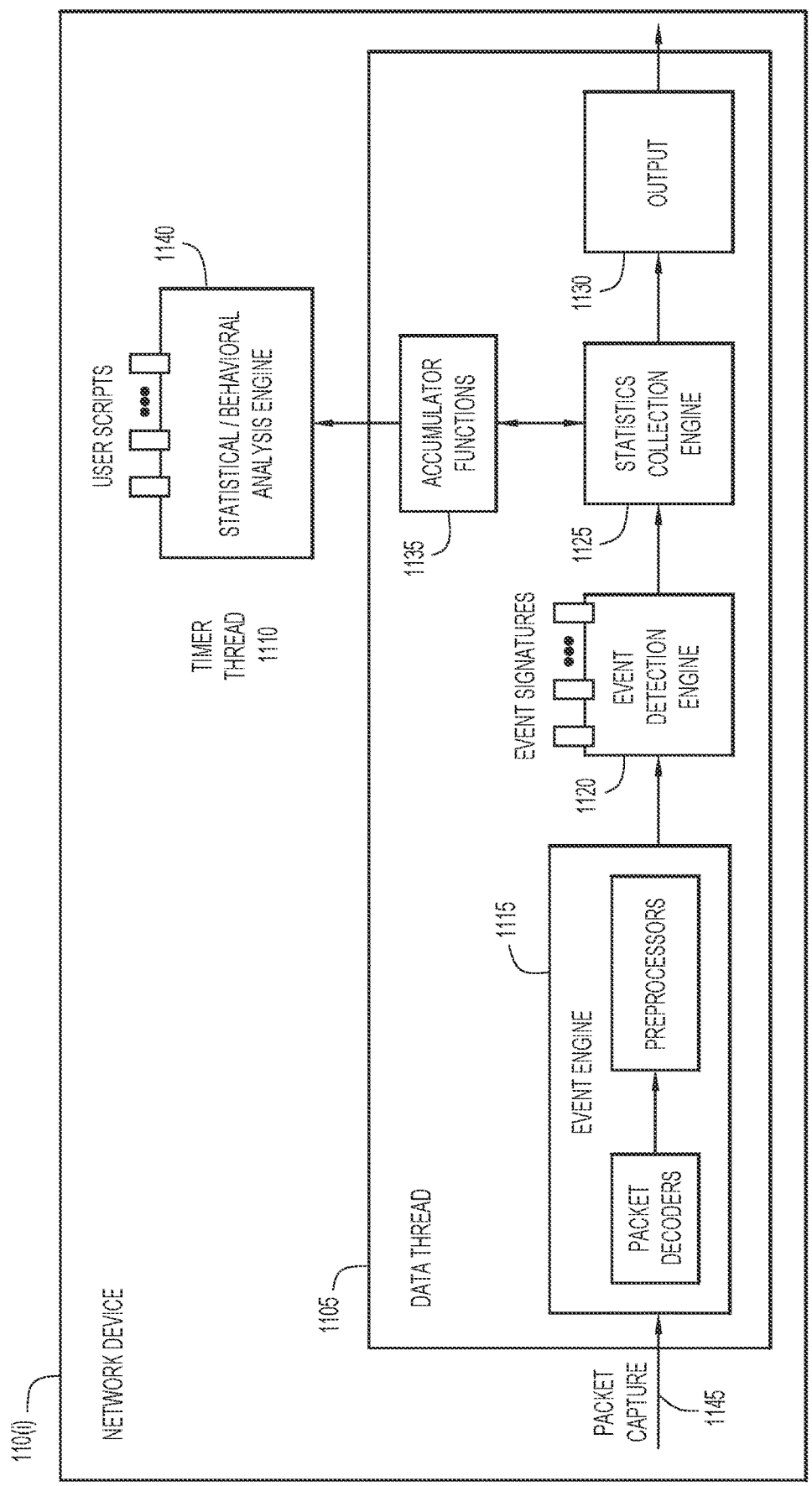
FIG. 11 illustrates functional components of a network device configured to detect a security threat to a network, according to an example embodiment.

FIG. 11 illustrates a network device 110(i) (e.g., network device 110(1)) including a collection of functional components configured to detect a network event. The network device 110(i) includes a data thread 1105 and a timer thread 1110. The functional components located in the data thread 1105 include event engine 1115, event detection engine 1120, statistics collection engine 1125, output 1130, and accumulator engine 1135. The timer thread 1110 includes statistical/behavioral analysis engine 1140.

At 1145, network device 110(*i*) captures a data packet. The event engine 1115 decodes and preprocesses the packet, and the event detection engine 1120 searches the preprocessed packet for event signatures. The statistical collection engine 1125 may analyze only those packets that match an event signature. Thus, in one example, only a subset of packets in the data plane are processed by the statistics collection engine 1125. The statistics collection engine 1125 may forward the packet to an output 1130.

The statistics collection engine 1130 may include predefined statistical accumulator functions 1135 such as count, sum, mean, standard deviations, entropy, top-n, etc. defined over an n-tuple key/value extracted from the packet. For example, if key={client_ip, server_ip}, value={packet_length}, and accumulator function=sum, then the statistics collection engine 1125 may collect the sum of packet lengths per the <client_ip, server_ip>2-tuple. The accumulator functions 1135 may implement approximate streaming statistics algorithms that are fast and require only a small amount of memory footprints.

The statistical/behavioral analysis engine 1140 may permit the network device 110(*i*) to analyze the statistical data collected by the statistics collection engine 1120 using one or more scripts. The statistical/behavioral analysis engine 1140 may be located outside the data thread 1105 in order to be invoked periodically, instead of for every packet. Generally, if the period is not set to an arbitrarily large value, this process preserves the accuracy/sensitivity of behavioral/anomaly detection analysis as per-packet processing. Empirically, behavioral analysis is seldom sensitive to point events.

Figure 12:
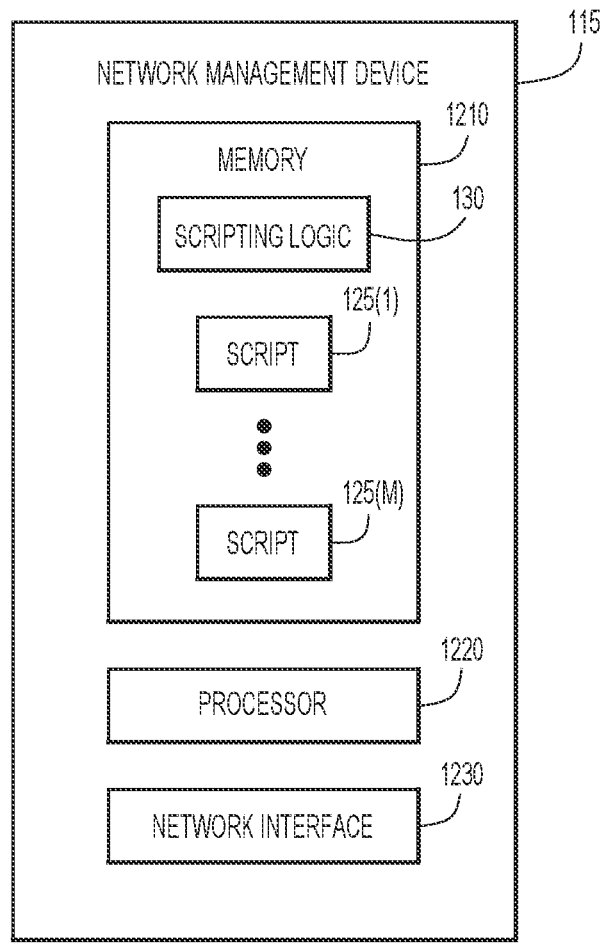
FIG. 12 is a block diagram of a network management device configured to hierarchically activate scripts for security threat detection, according to an example embodiment.

FIG. 12 is a simplified block diagram of network management device 115 configured to implement the techniques presented herein. In this example, the network management device 115 includes a memory 1210, one or more processors 1220, and a network interface 1230. The memory 1210 includes scripts 125(1)-125(M) and instructions for scripting logic 130. The one or more processors 1220 are configured to execute instructions stored in the memory 1210 for the scripting logic 130. When executed by the one or more processors 1220, the scripting logic 130 causes the network management device 115 to perform operations described herein. The network interface 1230 is a network interface card (or multiple instances of such a device) or other network interface device that enables network communications on behalf of the network management device 115 for sending and receiving messages as described above.

The memory 1210 may be read only memory (ROM), random access memory (RAM), magnetic disk storage media devices, optical storage media devices, flash memory devices, electrical, optical, or other physical/tangible memory storage devices. Thus, in general, the memory 1210 may be one or more tangible (non-transitory) computer readable storage media (e.g., a memory device) encoded with software comprising computer executable instructions and when the software is executed (by the processor 1220) it is operable to perform operations described herein.

Figure 13:
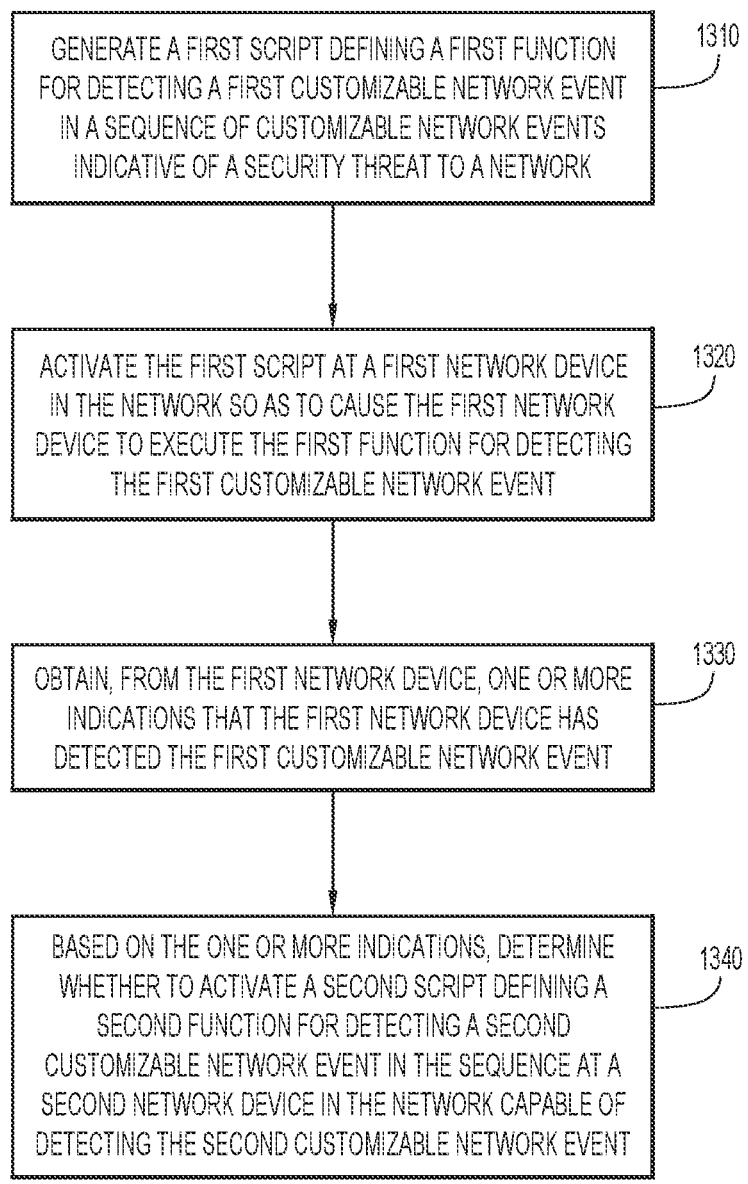
FIG. 13 is a flow chart of a method for hierarchically activating scripts for detecting a security threat to a network, according to an example embodiment.

FIG. 13 is a flowchart of a method 1300 for hierarchically activating scripts for detecting a security threat to a network. The method 1300 may be performed by a network management device (e.g., network management device 115). At 1310, the network management device generates a first script defining a first function for detecting a first customizable network event in a sequence of customizable network events indicative of a security threat to a network. At 1320, the network management device activates the first script at a first network device in the network so as to cause the first network device to execute the first function for detecting the first customizable network event. At 1330, the network management device obtains, from the first network device, one or more indications that the first network device has detected the first customizable network event. At 1340, based on the one or more indications, the network management device determines whether to activate a second script defining a second function for detecting a second customizable network event in the sequence at a second network device in the network capable of detecting the second customizable network event.

Conventional approaches to threat hunting have at least three major issues. First, conventional data planes can only handle a limited number of network events (mainly simple network events such as file hash checks, black-listed/suspicious IPv4/IPv6, domain checks, etc.). However, threat hunting is a skill which requires enormous creativity in using multiple heuristics comprising various network events to extract data. This requires complex filtering and preprocessing of streaming network data over time employing various statistical and logical operations to detect attacks. As such, conventional approaches lack an acceptable level of data plane flexibility.

Second, conventional techniques typically fail to use expressive and flexible languages to define network events. Using languages and scripts as described herein may enable detection of various network events required to identify new attacks (e.g., heuristics to alert a user of zero-day attacks). Moreover, the data plane described herein may support the underlying statistical libraries, extractors (e.g., various Transmission Control Protocol (TCP)/IP or non-TCP/IP (e.g., Internet of Things (IoT) protocol extractors)) or even more complex machine learning libraries to support detection of various network events.

Third, conventional techniques lack comprehensive support for content within network events, such as patterns, SHA-256, domain, Uniform Resource Locator (URL), IPv4, IPv6, etc. To support flexibility in terms of defining various network events, the techniques described herein express more content and relationships therein, instead of simply performing lookups for a list of known malicious characteristics.

Conventional behavioral analytics systems for network security do not take the platform-oriented approach described herein. As such, specific behavioral use cases are "baked" into conventional systems, and it is difficult to add new behaviors/security threats or support different types of behaviors. These systems are deeply coupled to the specific use cases that they are designed to address. In other words, conventional approaches are not flexible enough to address new use cases or behaviors without tremendous effort (e.g., significant changes to the code). Since behaviors are not static, the behavioral analytics system described herein has a platform-oriented approach to provide flexibility for performing various behavioral analytics use cases dynamically.

In one example, the platform provides a set of generic programmatic abstractions over which a rich set of behavioral models may be expressed, from simple statistical models to more complex machine learning classifiers. In another example, the platform provides a rich set of programmatic abstractions for efficiently filtering and extracting features from network traffic. For instance, instead of consistently extracting a fixed set of features (or all the features that the system supports), the network data plane only extracts what is required to evaluate the specific behaviors. Also, multiple behavioral modules may share filtering and extraction operations such that behavioral modules that share a common subset of the features are extracted only once.

In yet another example, the platform provides a unified data processing interface for both data collection for (continuous) learning of the behavioral model, as well as for processing streaming data for continuous model evaluation. In still another example, the enterprise network may be a highly-distributed infrastructure and the effective security analytics solution described herein has enterprise-wide visibility. Therefore, the platform may automatically enable a behavioral model to be evaluated across a distributed enterprise network infrastructure while providing the user with the abstraction of a centralized system.

In a further example, the platform may be effectively and efficiently deployed over a highly diverse enterprise infrastructure ranging from memory and processing constrained data plane nodes that have almost real-time access to the data to cloud servers that have almost no resource constraints but do not have immediate access to the data. In still a further example, the platform is operable in both "detection" and "prevention" mode. In prevention mode, the system may perform real-time classification and enforcement based on policies associated with the results of the classification.

The platform described herein may provide a programmable data plane with programmatic abstractions over which many different types of behavioral models can be expressed and evaluated, instead of being designed to serve a specific use case or a specific type of behavioral model. Unlike conventional systems that can only collect a fixed or limited set of features to serve specified use cases and behavioral models, the platform described herein provides a rich set of generic programmatic abstractions for feature extraction over a network stream.

Moreover, unlike conventional systems that have a box-centric approach, each network device operates independently. Any aggregation/correlation across events raised by individual network devices may be performed by a separate system (e.g., a network management device). The platform described herein provides support services that eases the distributed deployment and communication across the various entities, and has a threat-centric approach. In this approach, a threat may be represented as a function of multiple behavioral artifacts spread across space (e.g., different network locations) and time (e.g., stream processing) and the system may automatically program a distributed set of nodes to detect these behavioral artifacts and aggregate them to detect a threat. The platform may also provide a unified interface for programmable data collection for training the statistical models, and for a programmable data plane for evaluating the trained models on real-time network streams.

Furthermore, unlike conventional systems, the platform implements a mechanism for conditional invocation of detection scripts. Many threat scenarios inherently exhibit a staged structure, and multiple threats (often belonging to a similar class of threats) may share common behavioral artifacts in early stages. For example, volumetric threats are characterized by a general increase in the traffic volume in the early stage. Determining the specific type of the attack, or whether the increase in the volume is legitimate, often requires deeper investigation. However, constantly searching for specific volumetric attacks wastes resources. In the platform described herein, a user may write a set of scripts searching for specific behavioral artifacts which conditionally invoke each other to efficiently detect threats.

In one example, a script may compute a simple aggregate sum over the number of packets received by the platform. When a certain threshold for the number of packets received is crossed, this script may invoke another script which maintains a packet count per destination port/IP address to discover more about the attack scenario. This script may in turn invoke another script that performs a deep packet inspection on the protocol headers to determine exactly what type of attack (or possibly a legitimate flash crowd) is occurring. Similarly, this concept of modularity and conditional invocation may permit the platform to efficiently detect most threats that are characterized by multiple kill chain stages (e.g., reconnaissance, weaponization, delivery, exploit, installation, C&C, actions, etc.).

Techniques described herein may enable expression of a rich heuristic which is conditional on multiple different statistics at different levels, such as a complex function of average packets in a connection combined with an average volume of other connections and the corresponding connection rate. A user may run multiple scripts, each evaluating a different heuristic, and then eventually choose the script that is best suited for the detection of a given security threat.

The programmable data plane described herein may detect network events in order to prevent/address various security threats/attacks (e.g., zero-day attacks, Distributed Denial of Service (DDoS) attacks which may not be detectable by only a single network device, etc.). In one example, instead of manually integrating scripts across the various network devices, the user may instead write a single collection of scripts for a complete chain of network events. The platform may then automatically deploy the various script in the appropriate network devices at the appropriate times.

The programmable security plane overlaying the network data plane has a hybrid architecture comprising both network devices/modules for distributed, online, near-real time, stream processing and cloud modules/devices/servers for consolidated, and possibly offline, batch processing. However, this underlying distributed module architecture may be hidden from the user, who may be presented with a uniform scripting abstraction through which the security plane may be programmed. The uniform scripting abstraction allows the user to express a rich set of behavioral semantics, implement the entire end-to-end analytics pipeline to train and evaluate different behavioral models, and automatically operationalize these models for actively evaluating network traffic streams.

The scripting platform may provide a unified scripting interface for a programmable, near-real time, model evaluation plane. The model evaluation plane may provide a programmable layer on the network data plane, and provide a rich set of programmatic semantics for expressing a wide range of behavioral models (from simple statistical models to more complex machine learning classifiers) and evaluating these models on live network traffic streams. Proximity to the data plane and performing continuous model evaluation directly on the network stream may improve the responsiveness of the platform over traditional batch processing systems.

Effective behavioral analytics systems should continuously update their models based on new data and feedback. In current approaches, model creation/training and model evaluation phases are de-coupled and separate instrumentation is required to enable each phase. For example, many of behavioral systems need to implement Netflow (or other similar techniques) to capture metadata from the network and combine the metadata with a different device log and security alert sources (such as security information and event management tools) to train the models. These models may be used to analyze the network traffic (often performed offline as well). One problem with this approach is that often the type of models that could be created is constrained by the data that is available through the data collection instrumentation. A user who is creating and training behavioral models may not be completely in control of which models can be used. Hence, the user is restricted from employing the best possible model that the data can support. Also, the user may not be at liberty to tweak the models (e.g., add an additional feature) freely as a result of this restriction.

The closed-loop design of the platform described herein permits the programmable evaluation plane to also function as the programmable data collection plane. The data collection plane may be programmed to collect any data that may be required to create the models in the backend offline systems which may be directly dropped into the evaluation plane for online evaluation of the network traffic. Also, the models may be continuously adapted/retrained based on the feedback from the evaluation plane. This feedback, closed-loop design may allow for creating a wide range of different models and provide the security researcher greater freedom to search for relevant information.

Many conventional behavioral analytics systems suffer from alert fatigue caused by high false positive rates. The general approach to reducing false positives is to train models on more data and continuously re-train the models based on feedback. By contrast, as described herein, each classifier model may be a behavioral trait that can be composed into a higher-order behavioral graph. Such a behavioral graph may allow composing behavioral traits across multiple different types of entities or principals such as network, endpoints, users, etc., behavioral traits of an entity instance (e.g., a user) in the context of an entity group (e.g., role-based user groups), and behavioral traits across time with access to historical data. The programmatic interface may thus define an arbitrary composition of behavioral traits to define higher-order behaviors. The false positive rates of higher-order behavioral classifiers may be much lower than lower order behavioral traits, both because of the product of probabilities as well as the superior ability of higher-order behavioral classifiers to classify malicious/threat behaviors from simple anomalous behaviors. Higher-order behaviors may generally be constructed in the backend.

Conventionally, expressiveness and flexibility are provided at the cost of performance. To create a more programmable platform centric design, a unique online-offline hybrid system design is described herein to provide a uniform programmatic abstraction. This means that to a user writing a single behavioral analytics script on the platform, the system may appear to be single entity with access to all the data that the analysis requires, whereas in reality a network management device may fragment the behavioral analytics script into multiple online and offline platform scripts which are executed across different distributed platform nodes.

Performance concerns may be addressed further by balancing the tradeoff between configurability and programmability. Configurable primitives may be natively supported by the platform itself. For example, configuration may include extracting known network/application layer headers and performing well known pre-processing on them (e.g., normalizing a URL and computing the entropy of an associated DNS query). Programming primitives may allow the platform to be extended based on specific requirements. For example, identifying and extracting a new application header or new way of processing data may be expressed through programming primitives. The extent of programmability (e.g., regular expression, domain specific language, general purpose language, etc.) depends on the specific platform and what type of extensions are expected.

The platform described herein may include statistical aggregation functions along with a wide range of protocol feature extractions and processing. The platform may improve programmability by allowing callbacks into user defined code modules. In the online model evaluation plane, these callbacks may be synchronous (called at pre-specified fixed intervals) while for the offline modules the callbacks may be synchronous or asynchronous (based on events). This is because the online modules may be expected to generate the simplest (atomic-level) behavioral traits by continuously processing the network traffic. These atomic behavioral traits may be combined by the offline modules to define more complex behaviors.

The techniques described herein may provide a programmable platform for closed-loop behavioral analytics where a user can write scripts to detect specific behaviors relevant to the network environment. This system provides a programmatic abstraction for expressing a rich set of behavioral models, from simple statistical models to more complex machine learning classifiers and enabling the models on the data plane. A user may thereby flexibly express various new models/classifiers for threat detection and enable the models/classifiers on the data plane.

A rich set of programmatic abstractions are provided for efficiently filtering and extracting features from network traffic. These abstractions may be used for expressing behavioral models. A programmable data collection engine may be implemented for multiple different backend analytics systems. Data collection, learning, detection, and enforcement are decoupled such that those operations may be independently programmed to address different security as well as policy enforcement use cases while remaining tied together to support an end-to-end behavioral analytics system. The platform described herein may enable active interaction between a user and the data plane in order to express statistical or more complex machine learning models. This capability allows customizable observations with meaningful and actionable findings.

In one form, a method is provided. The method comprises: generating a first script defining a first function for detecting a first customizable network event in a sequence of customizable network events indicative of a security threat to a network; activating the first script at a first network device in the network so as to cause the first network device to execute the first function for detecting the first customizable network event; obtaining, from the first network device, one or more indications that the first network device has detected the first customizable network event; and based on the one or more indications, determining whether to activate a second script defining a second function for detecting a second customizable network event in the sequence at a second network device in the network capable of detecting the second customizable network event.

In another form, an apparatus is provided. The apparatus comprises: a network interface configured to enable communications to/from a network; and one or more processors coupled to the network interface, wherein the one or more processors are configured to: generate a first script defining a first function for detecting a first customizable network event in a sequence of customizable network events indicative of a security threat to the network; activate the first script at a first network device in the network so as to cause the first network device to execute the first function for detecting the first customizable network event; obtain, from the first network device, one or more indications that the first network device has detected the first customizable network event; and based on the one or more indications, determine whether to activate a second script defining a second function for detecting a second customizable network event in the sequence at a second network device in the network capable of detecting the second customizable network event.

In another form, one or more non-transitory computer readable storage media are provided. The non-transitory computer readable storage media are encoded with instructions that, when executed by a processor, cause the processor to: generate a first script defining a first function for detecting a first customizable network event in a sequence of customizable network events indicative of a security threat to a network; activate the first script at a first network device in the network so as to cause the first network device to execute the first function for detecting the first customizable network event; obtain, from the first network device, one or more indications that the first network device has detected the first customizable network event; and based on the one or more indications, determine whether to activate a second script defining a second function for detecting a second customizable network event in the sequence at a second network device in the network capable of detecting the second customizable network event.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   generating a first script defining a first function for detecting a first customizable network event in a sequence of customizable network events indicative of a security threat to a network;
   activating the first script at a first network device in the network so as to cause the first network device to execute the first function for detecting the first customizable network event;
   obtaining, from the first network device, one or more indications of one or more numerical probabilities that the first network device has detected the first customizable network event;
   in response to the one or more indications, determining whether to activate a second script defining a second function for detecting a second customizable network event in the sequence at a second network device in the network capable of detecting the second customizable network event; and
   in response to determining to activate the second script, activating the second script at the second network device so as to cause the second network device to execute the second function for detecting the second customizable network event.

2. The method of claim 1, wherein determining whether to activate the second script includes determining whether to activate the second script based on whether one or more statistics associated with the one or more indications exceeds a threshold.

3. The method of claim 1, further comprising:
   in response to determining not to activate the second script, refraining from activating the second script at the second network device based on the one or more indications.

4. The method of claim 1, further comprising:
   obtaining, from the second network device, one or more indications that the second network device has detected the second customizable network event.

5. The method of claim 1, wherein a third script defines a function for processing data associated with the first customizable network event to assist the first network device in detecting the first customizable network event, the method further comprising:
   activating the third script at one or more cloud servers so as to cause the one or more cloud servers to execute the function for processing the data associated with the first customizable network event to assist the first network device in detecting the first customizable network event.

6. The method of claim 5, wherein the function for processing the data associated with the first customizable network event includes determining that the first customizable network event has not occurred when the data associated with the first customizable network event is above or below a threshold.

7. An apparatus comprising:
   a network interface configured to enable communications to/from a network; and
   one or more processors coupled to the network interface, wherein the one or more processors are configured to:
      generate a first script defining a first function for detecting a first customizable network event in a sequence of customizable network events indicative of a security threat to the network;
      activate the first script at a first network device in the network so as to cause the first network device to execute the first function for detecting the first customizable network event;
      obtain, from the first network device, one or more indications of one or more numerical probabilities that the first network device has detected the first customizable network event;
      in response to the one or more indications, determine whether to activate a second script defining a second function for detecting a second customizable network event in the sequence at a second network device in the network capable of detecting the second customizable network event; and
      in response to determining to activate the second script, activate the second script at the second network device so as to cause the second network device to execute the second function for detecting the second customizable network event.

8. The apparatus of claim 7, wherein the one or more processors are configured to determine whether to activate the second script based on whether one or more statistics associated with the one or more indications exceeds a threshold.

9. The apparatus of claim 7, wherein the one or more processors are further configured to:
   in response to determining not to activate the second script, refrain from activating the second script at the second network device based on the one or more indications.

10. The apparatus of claim 7, wherein the one or more processors are further configured to:

obtain, from the second network device, one or more indications that the second network device has detected the second customizable network event.

11. The apparatus of claim 7, wherein a third script defines a function for processing data associated with the first customizable network event to assist the first network device in detecting the first customizable network event, and wherein the one or more processors are further configured to:

activate the third script at one or more cloud servers so as to cause the one or more cloud servers to execute the function for processing the data associated with the first customizable network event to assist the first network device in detecting the first customizable network event.

12. The apparatus of claim 11, wherein the function for processing the data associated with the first customizable network event includes determining that the first customizable network event has not occurred when the data associated with the first customizable network event is above or below a threshold.

13. One or more non-transitory computer readable storage media encoded with instructions that, when executed by a processor, cause the processor to:

generate a first script defining a first function for detecting a first customizable network event in a sequence of customizable network events indicative of a security threat to a network;

activate the first script at a first network device in the network so as to cause the first network device to execute the first function for detecting the first customizable network event;

obtain, from the first network device, one or more indications of one or more numerical probabilities that the first network device has detected the first customizable network event;

in response to the one or more indications, determine whether to activate a second script defining a second function for detecting a second customizable network event in the sequence at a second network device in the network capable of detecting the second customizable network event; and in response to determining to activate the second script, activate the second script at the second network device so as to cause the second network device to execute the second function for detecting the second customizable network event.

14. The one or more non-transitory computer readable storage media of claim 13, wherein the instructions cause the processor to determine whether to activate the second script based on whether one or more statistics associated with the one or more indications exceeds a threshold.

15. The one or more non-transitory computer readable storage media of claim 13, wherein the instructions further cause the processor to:

in response to determining not to activate the second script, refrain from activating the second script at the second network device based on the one or more indications.

16. The one or more non-transitory computer readable storage media of claim 13, wherein the instructions further cause the processor to:

obtain, from the second network device, one or more indications that the second network device has detected the second customizable network event.

17. The one or more non-transitory computer readable storage media of claim 13, wherein a third script defines a function for processing data associated with the first customizable network event to assist the first network device in detecting the first customizable network event, and wherein the instructions further cause the processor to:

activate the third script at one or more cloud servers so as to cause the one or more cloud servers to execute the function for processing the data associated with the first customizable network event to assist the first network device in detecting the first customizable network event.

18. The one or more non-transitory computer readable storage media of claim 17, wherein the function for processing the data associated with the first customizable network event includes determining that the first customizable network event has not occurred when the data associated with the first customizable network event is above or below a threshold.

19. The method of claim 1, wherein generating the first script includes:

generating a first script that includes a timed callback function list that defines a frequency at which the first network device is to provide the one or more indications.

20. The method of claim 1, wherein generating the first script includes:

generating a first script that includes an observation list that causes the first network device to detect one or more heuristics related to the first customizable network event.

* * * * *